3,415,830
PROCESS FOR PREPARING INTERMEDIATES OF GARRYA ALKALOIDS

Wataru Nagata, Nishinomiya-shi, Masayuki Narisada, Kyoto-shi, Toshio Wakabayashi, Nishinomiya-shi, and Tsutomu Sugasawa, Kobe-shi, Japan, assignors to Shionogi & Co., Ltd., Osaka-shi, Japan
No Drawing. Filed Jan. 25, 1965, Ser. No. 427,932
Claims priority, application Japan, Jan. 27, 1964, 39/3,892
19 Claims. (Cl. 260—287)

ABSTRACT OF THE DISCLOSURE

The total synthesis of Garrya alkaloids starts from compounds of the Formula I, infra, and proceeds through a series of steps involving dehydration, hydroboration, selective esterification, solvolysis or base-catalyzed elimination with simultaneous rearrangement (or dehydration, epoxidation treatment with a Lewis acid, oxidation and Wolff-Kishner reduction), followed by carrying out Wittig's reaction or a Grignard reaction, halogenation, epoxidation, reduction, and reaction with ethylene halohydrin and ethylene oxide. A series of novel intermediates are thus prepared.

The present invention relates to the total synthesis of Garrya alkaloids and intermediates therefor, especially to the total synthesis of dihydroveatchine and dihydro pyrolysis base B (Wiesner), of which inter-conversions to and from garryine and veatchine were well established by K. Wiesner, S. W. Pelletier, etc. (Chem. Ber., 86, 800 (1953)); (Chem. and Ind., 1879 (1963)), as follows:

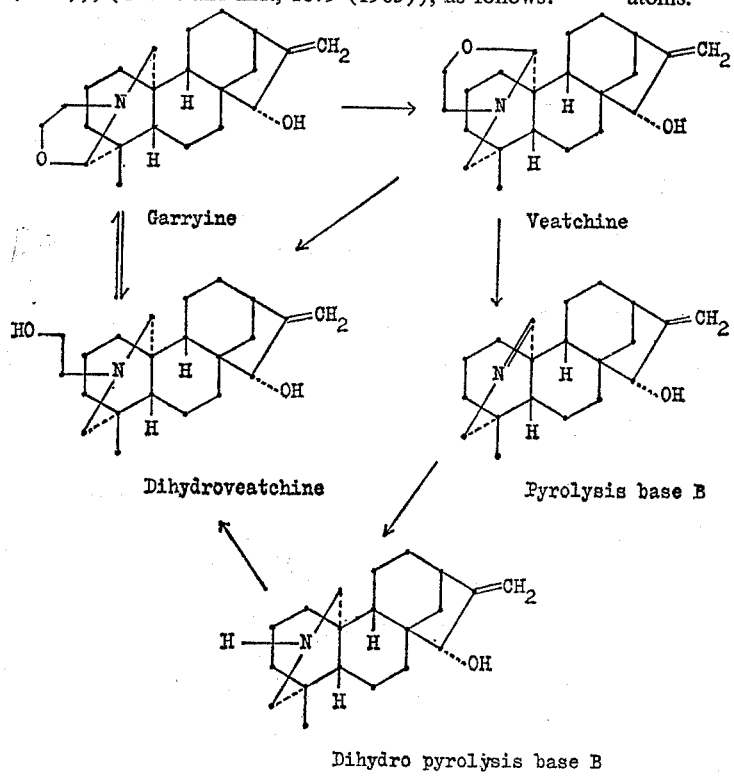

Dihydro pyrolysis base B

Garryine and veatchine are the main principles of physiologically active extract from Garrya plants, which has been used in treatment of intermittent fever and as a cathartic, and belong to the diterpene alkaloid group closely correlated to Aconitum and Delphinium alkaloids such as atisine, etc. Garryine hydrochloride, at a dose of 5 mg./kg., decreases blood pressure by 20 mm. Hg for fifteen to thirty minutes and the heart rate by 24 beats per minute [Powell et al., J. Am. Pharm. Assoc. (Sci. Ed.), 45, 733 (1956)].

Recently, since the chemical and geographical structures were established, many approaches to the synthesis thereof were tried; however, no report of success has been reported although several reports of failure have been published.

The present inventors have succeeded for the first time in the total synthesis of dihydroveatchine and dihydro pyrolysis base B (Wiesner) according to the present invention and, therefore, has accomplished the total synthesis of the Garrya alkaloids.

The process of the present invention starts from the compound of the general Formula I, which was synthesized recently from the tricyclic conjugated enone of the following formula:

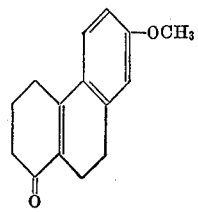

by the method previously discovered by the inventors in the study course of total synthesis of atisine (J. Am. Chem. Soc., 85, 2342 (1963)).

The term "lower" where used in the present specification and claims refers to groups containing up to 8 carbon atoms.

The process of the present invention comprises dehydrating (Step 1) a compound of the Formula I wherein R represents a member selected from the group consisting of a hydrogen atom, cyano group, a lower alkyl group, a lower alkanoyl group, a lower alkoxycarbonyl group and a lower hydrocarbon-sulfonyl group, R' represents a member selected from the group consisting of a lower alkanoyl group and a lower alkoxycarbonyl group and X represents hydroxyl group by treatment with a member selected from the group consisting of a hydrocarbon-sulfonyl halide and a halogenating agent followed by treatment with an organic base, converting thus produced compound of the Formula II wherein R represents a member selected from the group consisting of a cyano group, a lower alkanoyl group, a lower alkoxycarbonyl group and a lower hydrocarbon-sulfonyl group and R' represents a member selected from the group consisting of a hydrogen atom, a lower alkanoyl group and a lower alkoxycarbonyl group by a route selected from A and B:

A: hydroborating (Step 2) the Compound II, selectively esterifying (Step 3) thus produced compound of the Formula III wherein R and R' have the aforesaid meanings and R" is a hydrogen atom with a lower arenesulfonyl halide of the formula:

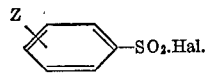

wherein Hal. represents a halogen atom and Z represents substituents up to 2 in number selected from the group consisting of a hydrogen atom, a halogen atom, a lower alkyl group, nitro group and a lower alkoxy group and subjecting (Step 4) thus produced compound of the Formula III wherein R and R' have respectively the same meanings as above and R" represents a lower arenesulfonyl group of the formula:

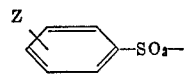

wherein Z is as precedingly defined, to solvolysis or base-catalyzed elimination accompanied with simultaneous rearrangement, B: epoxidizing (Step 2') the compound II with an organic peracid, treating (Step 3') thus-produced compound X wherein R is as precedingly defined and R' is H with a Lewis acid, oxidizing (Step 4') thus-produced compound of the Formula XI wherein R and R' are as precedingly defined, and Y is a bis(lower alkyl) ketal group or a lower alkylene ketal group, with an oxidizing reagent and subjecting (Step 4") thus-produced compound of the Formula XII wherein R and Y are as precedingly defined to Wolff-Kishner's reduction method,

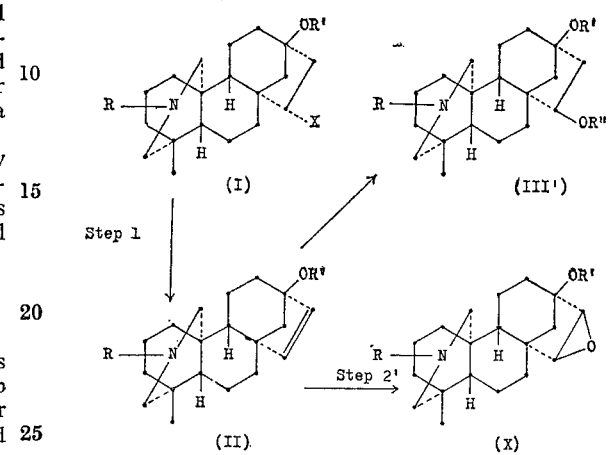

Then thereafter subjecting (Step 5) thus-produced compound of the Formula IV wherein R is as precedingly defined and Y represents an oxygen atom, to Wittig's reaction or Grignard's reaction followed by dehydration, halogenating (Step 6) thus-produced compound of the Formula V where R is as precedingly defined, by Wohl-Ziegler's method, epoxidizing (Step 7) thus-produced compound of the Formula VI wherein R is as precedingly defined and X represents a halogen atom, with an organic peracid, reducing (Step 8) thus produced compound of the Formula VII wherein R is H, a cyano group, a lower alkyl group, a lower alkanoyl group, a lower alkoxycarbonyl group or a lower hydrocarbon-sulfonyl group and X is as precedingly defined, and, finally subjecting (Step 9)

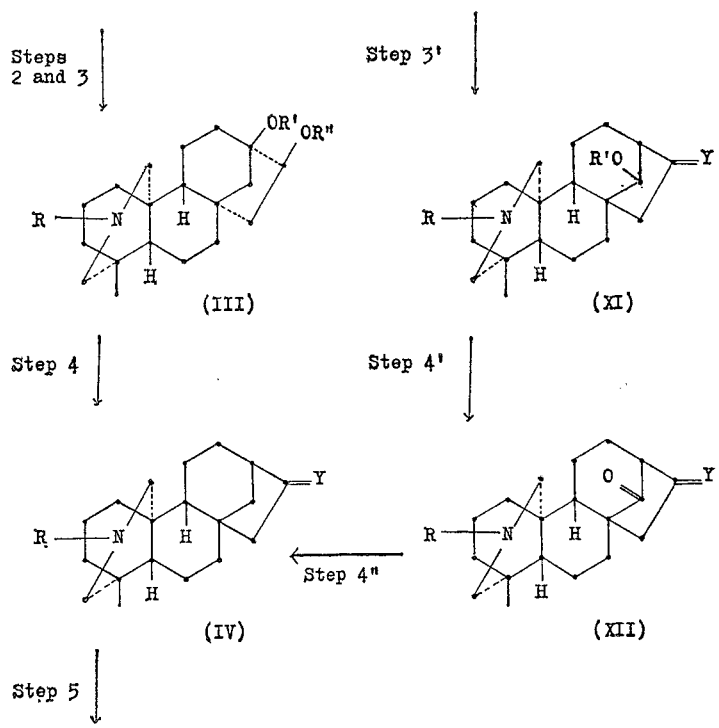

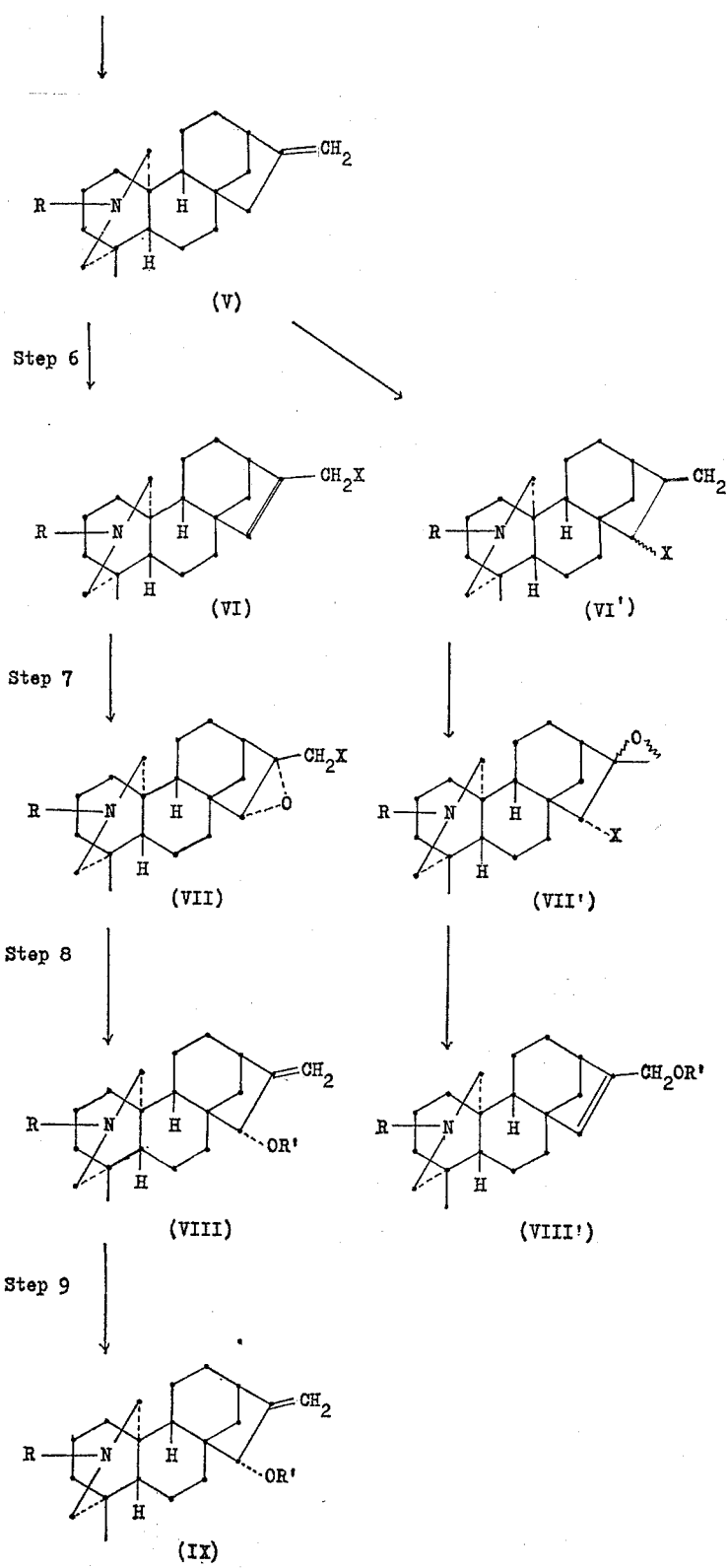

thus-produced compound of the Formula VIII wherein R is H and R' is a hydrogen atom, a lower alkonoyl group or a lower alkoxycarbonyl group, to reaction with an ethylene halohydrin or ethylene oxide to produce a compound of the Formula IX wherein R represents the 2-hydroxyethyl group and R' has the precedingly recited meaning, the functional group R, R', R", X and Y of compounds II to XII each being changed within their respective meanings in or after the respective reaction steps in per se known manner.

In the specification, nomenclature and numbering of the compounds are retained as is shown in the following illustration, namely, the compound I wherein R is methanesulfonyl group, R' is acetyl group and X is hydroxyl group:

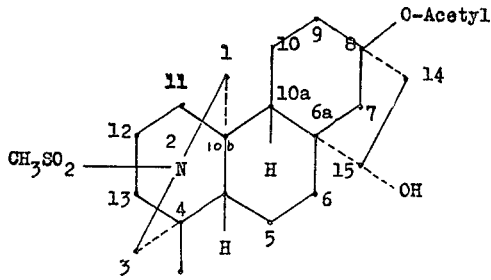

2-methanesulfonyl-4β-methyl-8β-acetyloxy-4β,10bβ-propano-6aα,8α-ethanoperhydrobenz[h]isoquinolin-15α-ol (Ia)

The Step 1, which comprises dehydrating the Compound I to convert it to Compound II, is carried out by a per se conventional mild dehydrating procedure, especially in a non-aqueous solvent excluding the use of strong inorganic base, so that 8β-acyloxy (I:R'=acyl) should be retained to avoid rearrangement (cf. J. Am. Chem. Soc., 85, 2342 (1963)). Thus, the Step 1 is carried out for example, by converting the Compound I (X=hydroxyl) to the corresponding 15α-sulfonate (I:X=a lower hydrocarbon-sulfonyloxy group such as methane-sulfonyloxy, ethanesulfonyloxy, propanesulfonyloxy, butanesulfonyloxy, pentanesulfonyloxy, hexanesulfonyloxy, benzenesulfonyloxy, toluenesulfonyloxy or xylenesulfonyloxy group) or 15α-halide (I:X=a halogen atom such as chlorine, bromine or iodine) by treatment with the corresponding lower hydrocarbonsulfonyl halide or halogenating agent in the usual manner followed by eliminating thus introduced 15α-group by treatment with an organic base such as pyridine, picoline, collidine, dimethylaniline or triethylamine under heating, to form 15(16)-double bond in the Compound II.

In the starting Compound I, a hydrogen atom, cyano group, a lower alkyl group such as methyl, ethyl, propyl, butyl, pentyl, hexyl, heptyl or octyl group, a lower alkanoyl group such as formyl, acetyl, propionyl, butyryl, pentanoyl, hexanoyl, heptanoyl or octanoyl group, a lower alkoxycarbonyl group such as methoxycarbonyl, ethoxycarbonyl, propoxycarbonyl, butoxycarbonyl, pentyloxycarbonyl, hexyloxycarbonyl or heptyloxycarbonyl group or a lower hydrocarbon-sulfonyl group such as methanesulfonyl, ethanesulfonyl, propanesulfonyl, butanesulfonyl, pentanesulfonyl, hexanesulfonyl, benzenesulfonyl, toluenesulfonyl or xylenesulfonyl group can be used for R and a lower alkanoyl group or a lower alkoxycarbonyl group, for example, those which have been designated above can be used for R', whereby the produced Compound II may retain the same substituents as originally contained except for hydrogen as R, which may be converted to the same hydrocarbon-sulfonyl group as that used in the reaction. When R is hydrogen or a lower alkyl group, it may preferably be changed to one of the other groups designated as above before the following Step 2 by the usual method. Also, R' may be changed to a hydrogen atom before the following Step 2.

The Step 2, which comprises hydroborating the Compound II to convert to the Compound III, is carried out by usual methods such as adding a boron hydride compound onto a double bond followed by oxidation with alkaline hydrogen peroxide solution. As the boron hydride compound used in the reaction, borin or boran generated by usual method such as that which comprises reacting sodium borohydride and a Lewis acid such as boron trifluoride or aluminum trichloride can be directly applied, however, more bulky boron hydride compounds are more profitably used to reduce the yield of the isomer III'. Thus, an addition compound of boron hydride with a bulky unsaturated hydrocarbon such as 2-methyl-2-butene, for example, bis(2,3-dimethylpropyl)borin or tetrakis(2,3-dimethylpropyl)boran, which can be easily obtainable by contact of a boron hydride with a bulky alkene, are much more effective to introduce predominantly a hydroxyl group into 14-position with β-configuration, under influence of steric hindrance.

In this step, a lower alkanoyl group or a lower alkoxycarbonyl group as R' may be retained under mild reaction condition, however, it may be hydrolyzed in many cases by the action of strong base.

The Step 3 comprises selectively esterifying the Compound III wherein R'' is a hydrogen atom, prepared by the above Step 2, to convert to the Compound III wherein R'' is a lower arene-sulfonyl group designated above such as benzenesulfonyl, toluenesulfonyl, xylenesulfonyl, p-bromobenzenesulfonyl, p-nitrobenzenesulfonyl or p-methoxybenzenesulfonyl group. This step is carried out by usual esterifying procedure such as that which comprises reacting the compound with the corresponding lower arenesulfonyl halide in the presence of a deacidifying agent. In this step, when R' in the starting compound is an acyl group such as a lower alkanoyl group or a lower alkoxycarbonyl group, an optional arenesulfonyl group can be applied within the meanings designated as above. However, when R' in the starting compound is a hydrogen atom, a more bulky arenesulfonyl group is preferable to reduce side-reaction which affords di-ester.

The Step 4 comprises solvolysis or base-catalyzed elimination accompanied with simultaneous rearrangement of the Compound III to convert to the Compound IV. This step can be accomplished by the said solvolysis, when R' is a hydrogen atom in the starting Compound III. Solvolysis can be carried out with an inorganic salt capable of elevating the polarity of the solution such as lithium perchlorate in an aprotic solvent such as tetrahydrofuran, diethylene glycol dimethyl ether or dimethylformamide. This step can be accomplished by treatment with a base, when R' in the starting Compound III is a hydrogen atom or an acyl group. The treatment with a base can be, when R' is a hydrogen atom, carried out with a base capable of deprotonating the 8β-hydroxyl group such as an alkali alkoxide, alkali hydride or alkali hydroxide and, when R' is an acyl group such as an alkanoyl or an alkoxycarbonyl group, carried out with a base capable of hydrolyzing the 8β-acyloxy group such as aqueous alkaline solution. The treatment with base is carried out in an appropriate solvent, in which a solvent system having medium polarity, for example, a mixture consisting of an alcohol-an ether-water system such as a mixture of dioxane-methanol-water, is much more profitably used. In the step the configuration, 6aα,8α-ethano bridge of the Compound III, is reversed to 6aβ,8β-ethano bridge in the Compound IV wherein Y is an oxygen atom.

The Step 5 comprises Wittig's reaction or Grignard's reaction followed by dehydration of the Compound IV to convert to the Compound V. Wittig's reaction is carried out by the usual method with triarylphosphine methylene compound such as triphenylphosphine methylene or methyl triphenyl phosphonium halide. Grignard's reaction followed by dehydration is carried out by usual method with methylmagnesium halide, whereby methyl group and hydroxyl group are introduced into 14-position, followed by usual method for dehydration which comprises a treatment with a dehydrating agent such as a halogenated phosphorus compound or a thionyl halide in a basic solvent, whereby 14-methylene structure is realized.

The Step 6, which comprises halogenating the Compound V by Wohl-Ziegler's method to convert to the Compound VI, is carried out per se known manner, e.g. by treating with a N-halo carboxylic acid amide or N-halo dicarboxylic acid imide with or without a catalyser such as benzoyl peroxide or light.

The Step 7, which comprises epoxydizing the Compound VI to convert to the Compound VII, is carried out by usual method using peracid, such as peracetic acid, perbenzoic acid or monoperphthalic acid.

The Step 8, which comprises reducing the Compound VII to convert to the Compound VII, is carried out by using a metal such as zinc in alcoholic or aqueous solvent such as methanol, ethanol, butanol, aqueous ethanol or aqueous dimethylformamide, whereby simultaneous dehalogenation occurs and forms an allyl alcohol structure. The Compound VIII thus produced bears a hydrogen atom, cyano group, a lower alkyl group, a lower alkanoyl group, a lower alkoxycarbonyl group or a lower hydrocarbonsulfonyl group as R, therefore, it must be converted to the Compound VIII bearing a hydrogen atom as R before treating the following Step 9.

The Compound VIII thus produced wherein R and R' are respectively hydrogen atoms is confirmed to correspond to the racemate of dihydro pyrolysis base B (Wiesner) by direct comparison of IR-spectra and mixed thin layer chromatography on "Kieselgel-G" (Merck) with benzene-ethanol-28%-ammonia (50:50:1). R' may be changed to a lower alkanoyl or a lower alkoxycarbonyl group, before carrying out the next Step 9, when R' is a hydrogen atom in the thus-prepared Compound VIII.

The Step 9, which comprises subjecting the Compound VIII to reaction with an ethylene halohydrin or ethylene oxide to produce the Compound IX, is carried out by usual method such as heating the mixture of the Compound VIII and a 2-hydroxy-ethylating agent using or without using solvent, wherein a base catalyser such as calcium carbonate acts to promote the reaction especially that using an ethylene halohydrin as the 2-hydroxyethylating agent. The Compound IX wherein R is 2-hydroxyethyl and R' is a hydrogen atom is confirmed as the racemate of dihydroveatchine by direct comparison of IR-spectra and mixed thin layer chromatography on alumina with ethyl acetate.

Instead of the above route A which comprises the Steps 2, 3 and 4, the route B which comprises the Steps 2', 3', 4' and 4" can be effected to convert the Compound II to the Compound IV.

The Step 2', which comprises epoxidizing the Compound II with an organic peracid to convert to the Compound X, is carried out by the usual method especially stated above in the Step 7.

The Step 3', which comprises treating the Compound X with a Lewis acid to convert to the Compound XI, is carried out by usual method with a Lewis acid such as aluminium trichloride, a dialkylaluminium halide, a trialkylaluminium, boron trifluoride, stannous or stannic chloride at low temperature such as room temperature. Before effecting the next Step 4', the product XI should be protected by ketalation on the 14-oxo function (Y) with lower alkanol such as methanol, ethanol, propanol, butanol, pentanol, hexanol, heptanol or octanol or a lower alkylenediol such as ethylene glycol, propylene glycol, butylene glycol, pentylene glycol, hexylene glycol, heptylene glycol or octylene glycol.

The Step 4', which comprises oxidizing the Compound XI to convert to the Compound XII, is carried out by usual method generally applied to convert secondary alcohol to oxo group using an oxidizing reagent such as chromium trioxide, potassium permanganate, N-halo carboxylic acid amide, N-halo dicarboxylic acid imide or an aluminium alkoxide, excluding acid medium.

The Step 4", which comprises subjecting the Compound XII to the said Wolff-Kishner's reduction method to afford the same Compound IV produced by the above route A, is carried out by known method as Wolff-Kishner's reduction and its modification such as Huang-Minlon's or Barton's method, however, as the 7-oxo group to be reduced is much affected with steric interference, a modification, which comprises hydrazone formation in the presence of a strong acid followed by usual alkali decomposition, is much more effectively used.

Throughout the above-mentioned synthetic route, the each products in respective steps may be isolated and confirmed following to the usual synthetic procedure, however, several steps can be carried out advantageously without isolation of products or intermediates according to the usual synthetic procedure. The latter procedure has another advantage so that the by-products can be removed at a step most convenient for separation techniques. For example, the by-product VI', in the Step 6, is most conveniently separated at the Step 8. In such procedure, probable by-products to disturb carrying out the following step should be removed by usual treatment common to experimental chemistry. The functional groups, R, R', R", X and Y, in the compounds in which they appear throughout the process of this invention can and may be each changed within their respective meanings designated as above in or after the respective reaction steps. Such inter-conversion of the functional groups may serve to make the techniques, such as separation, isolation or purification method, for example, crystallization, recrystallization or chromatography, to be used in carrying out the invention, more convenient. Cyanation of 2-position (R:H→CN) can be carried out by treatment with a cyanogen halide in the presence of deacidifying agent such as potassium carbonate in a non-aqueous solvent such as anhydrous tetrahydrofuran. Most procedures to be used for such inter-conversion of the functional groups can be left to the choice of a man skilled in the art. For example, elimination of this cyano group (R:CN→H) is carried out by reduction with lithium aluminium hydride, alkylation of 2-position (R:H→alkyl) is carried out by usual N-alkylation technique using an alkyl halide, reverse reaction can be effected by the said von Braun degradation, acylation inclusive of alkanoylation, sulfonylation and alkoxycarbonylation (R:H→acyl) can be carried by reaction with the corresponding acyl halide and reverse reaction can be effected by usual hydrolysis using acid or alkali or reductive cleavage such as said Birch's reduction. Conversion of R' and R" may be effected by the method described above. Ketalation of 14-oxo group (Y:O→ketal) is shown before in the Step 3', of which hydrolysis can be carried by usual method using acid catalyser.

Example 1.—($\pm$)-2-methanesulfonyl-4$\beta$-methyl-8$\beta$-acetyloxy - 4$\beta$,10b$\beta$-propano-6a$\alpha$,8$\alpha$-ethanoperhydrobenz[h] isoquinolin-15$\alpha$-ol-methanesulfonate (Ib)

Reacting 4.5 g. of ($\pm$)-2-methanesulfonyl-4$\beta$-methyl-8$\beta$ - acetyloxy - 4$\alpha$-10b$\alpha$-propano-6a$a$,8$\alpha$-ethanoperhydrobenz[h]isoquinolin-15$\alpha$-ol (Ia) and 3.24 ml. of methanesulfonyl chloride in 30 ml. of pyridine at room temperature for 15 hours, acidifying the reaction mixture by addition of 2 N-hydrochloric acid (300 ml.) under ice-cooling, extracting the mixture with chloroform and, after washing with water, dilute sodium carbonate solution and water and thereafter drying, removing the solvent affords 5.7 g. of crude product Ib, which gives 4.6 g. (yield, 87%) of pure crystals of Ib by recrystallization with a mixture of chloroform and methanol.

Ib: M.P. 237–238° C.

IR: $\nu_{max.}^{CHCl_3}$ 1730, 1360, 1170, 1322, 1148 cm.$^{-1}$

Analysis.—Calcd. for $C_{22}H_{33}O_4NS$: C, 64.84; H, 8.16; N, 2.78. Found: C, 54.93; H, 7.32; N, 2.79.

Example 2.—($\pm$)-2-methanesulfonyl-4$\beta$-methyl-8$\beta$-acetyloxy - 4$\beta$,10b$\beta$-propano-6a$\alpha$,8$\alpha$-ethenoperhydrobenz[h] isoquinoline (IIa)

Heating 1.5 g. of Ib in 15 ml. of collidine under reflux for 15.5 hours, acidifying the reaction mixture by addition by ice-cooled 2 N-hydrochloric acid (150 ml.), extracting the mixture with chloroform and, after washing with 2 N-sodium carbonate solution and water, removing the solvent affords crude product IIa, which gives pure crystals of IIa by recrystallization with a mixture of dichloromethane and ether (yield, 78.2%).

IIa: M.P. 200–200.5° C. (columns).
Analysis.—Calcd. for $C_{22}H_{33}ONS_4$: C, 64.84; H, 8.16; N, 3.44. Found: C, 65.25; H, 8.35; N, 3.73.

IR: $\nu_{max.}^{CHCl_3}$ 1729, 1366, 1149 cm.$^{-1}$

Example 3.—(±) - 2-methanesulfonyl-4β-methyl-8β-acetyloxy - 4β,10bβ-propano-6aα,8α-ethanoperhydrobenz[h]isoquinolin-14β-ol (IIIa) and -15β-ol (III′a)

Adding a solution of sodium borohydride (1.6 g.) in diethylene glycol dimethyl ether (30 ml.) dropwisely into a solution of boron trifluoride-etherate (11.7 ml.) in diethylene glycol dimethyl ether (50 ml.) within 40 minutes generates boron hydride gas, which is passed, through a trap cooled at —30° C., into an ice-cooled solution of 2-methyl-2-butene (7.4 g.) in anhydrous tetrahydrofuran (110 ml.). The reaction mixture is kept for 2 hours at 0° C. and thereafter cooled externally by ice, followed by the dropwise addition of a solution of IIa (1.7 g.) in tetrahydrofuran (20 ml.). The mixture is kept for 18 hours at room temperature in a closed vessel, after which 5 ml. of water is added dropwisely to decomposed remaining unreacted reagent. Oxidizing the mixture with 3 N-sodium hydroxide solution (50 ml.) and 30% aqueous hydrogen peroxide solution (50 ml.) under stirring and ice-cooling for 90 minutes, adding 500 ml. of ice-water, extracting thus prepared mixture with chloroform and, after washing with water, 2 N-hydrochloric acid and thereafter water, and removing the solvent affords 1.6 g. of crude crystals, which is determined as a mixture of IIIb and III′a by IR spectrum.

Example 4.—(±)-2-methanesulfonyl-4β-methyl-4β,10bβ-propano - 6aα,8α - ethanoperhydrobenz[h]isoquinolin-8β,14β-diol (IIIb) and -8β,15β-diol (III′b)

Hydrolyzing the mixed crystals of IIIb and III′a (1.6 g.) in a mixture of ethanol (160 ml.) and 2 N-potassium hydroxide solution (40 ml.) under reflux for 2.5 hours affords 1.6 g. of mixed crystals of IIIb and III′b.

Example 5. — (±)-2-methanesulfonyl-4β-methyl-8β,14β-isopropylidenedioxy - 4β,10bβ-propano-6aα,8α-ethanoperhydrobenz[h]isoquinoline (IIIc)

Refluxing the mixed crystals of IIIb and III′b (1.6 g.) in a mixture of acetone (200 ml.) and p-toluenesulfonic acid monohydrate (200 mg.) under stirring for 4 hours, adding 0.5% sodium hydrogen-carbonate solution after chilling, extracting the mixture with chloroform and chromatographing the obtained crude product on 60 g. of neutral alumina affords prismatic crystals of IIIc (yield, 61%) from the eluates with benzene to benzene-chloroform (9:1) scaly crystals of III′b (recovery yield, 18%) being recovered from the eluates with chloroform-methanol (49–9:1).

IIIc: M.P. 228–230° C. (from dichloromethane-ether).
Analysis.—Calcd. for $C_{23}H_{37}O_4NS$: C, 65.21; H, 8.80; N, 3.31. Found: C, 65.15; H, 8.84; N, 3.29.

IR; $\nu_{max.}^{CHCl_3}$ 1337, 1155, 1116, 1061 cm.$^{-1}$

III′b: M.P. 262–263° C. (from chloroform-methanol-ether).
Analysis.—Calcd. for $C_{20}H_{33}O_4NS$: C, 62.63, H, 8.67; N, 3.65. Found: C, 62.33, H, 8.71; N, 3.65.

IR: $\nu_{max.}^{Nujol}$ 3507, 3438, 1312, 1142 cm.$^{-1}$

Example 6.—(±)-2-methanesulfonyl-4β-methyl-4β,10bβ-propano - 6aα,8α-ethanoperhydrobenz[h]isoquinoline-8β,14β-diol 14-p-bromobenzenesulfonate (IIId)

Hydrolyzing 1 g. of IIIc in a mixture of acetic acid (50 ml.) and water (5 ml.) by heating at 100° C. for 30 minutes, distilling off the solvent and recrystallizing thus obtained crude product with dichloromethane-ether mixture affords crystalline IIIb (yield, 88%).

IIIb: M.P. 243–244° C.
Analysis.—Calcd. for $C_{20}H_{33}O_4NS$: C, 62.63; H, 8.67; N, 3.65. Found: C, 62.57; H, 8.71; N, 3.69.

Reacting IIIb (0.7 g.) and p-bromobenzenesulfonyl chloride (1.5 g.) in pyridine (10 ml.) for 40 hours at room temperature, adding crushed ice to the mixture to decompose the reagent which remained unchanged, acidifying by addition of 2 N-hydrochloric acid (100 ml., containing 100 g. of crushed ice), extracting the mixture with chloroform, and, after washing with water, evaporating affords crude IIId.

Example 7.—(±)-2-methanesulfonyl-4β-methyl-4β,10bβ-propano - 6aβ,8β - ethanoperhydrobenz[h]isoquinolin-14-one (IVa)

Refluxing the above crude IIId in a mixture of dioxane (120 ml.) and methanol (120 ml.) with 30% potassium hydroxide solution (40 ml.) for 3 hours, neutralizing the mixture with acetic acid (18 ml.) after chilling, concentrating the mixture under reduced pressure, extracting the concentrate with chloroform and, after washing with water, chromatographing the extract on 30 g. of neutral alumina affords crystalline IVa (yield, 70%) from the eluates of petroleum ether-benzene (1:4).

IVa: M.P. 215–217° C. (from dichloromethane-ether).
Analysis.—Calcd. for $C_{20}H_{31}O_3NS$: C, 65.71; H, 8.55; N, 3.83. Found: C, 65.38; H, 8.55; N, 3.82.

IR: $\nu_{max.}^{CHCl_3}$ 1379, 1339, 1153 cm.$^{-1}$

EXAMPLE 8. — (±)-2-methanesulfonyl-4β-methyl-14-methylene - 4β,10bβ - propano-6aβ,8β,-ethanoperhydrobenz[h]isoquinoline (Va)

To 1.36 N-butyllithium ethereal solution (3 ml.), 15 ml. of anhydrous ether and 1.7 g. of triphenylphosphonium bromide are added and the mixture is stirred for 2 hours at room temperature in a closed vessel. Adding dropwisely IV (0.5 g.) in anhydrous tetrahydrofuran (20 ml.) into the above-prepared mixture, distilling off ether, adding tetrahydrofuran (20 ml.), refluxing the reaction mixture for 5 hours in nitrogen atmosphere, extracting the mixture with chloroform after addition of water, and chromatographing thus obtained extract on 30 g. of neutral alumina affords prismatic crystals of Va (yield, 90%) from the eluates of petroleum etherbenzene (4:1).

Va: M.P. 136–137° C. (from ether-pentane).
Analysis.—Calcd. for $C_{21}H_{33}O_2NS$: C, 69.38, H, 9.15, N, 3.85. Found: C, 69.65, H, 9.30, N, 4.15.

IR: $\nu_{max.}^{CHCl_3}$ 3060 (shoulder), 1659, 1336, 1149, 882 cm.$^{-1}$

Example 9.—(±)-4β-methyl-14-methylene-4β,10bβ-propano - 6aβ,8β - ethanoperhydrobenz[h]isoquinoline (Vb)

Adding dropwisely a solution of Va (434 mg.) in a mixture of anhydrous tetrahydrofuran (20 ml.) and anhydrous ethanol (3 ml.) into a solution prepared by dissolving metallic lithium (874 mg.) into liquid ammonia (90 ml., distilled over metallic sodium), stirring the reaction mixture for 30 minutes in a Dry Ice-acetone bath (—70° C.), adding dropwisely anhydrous ethanol (10 ml.) thereto to decompose the reagent which remained unchanged, distilling off the ammonia, pouring the mixture into cold water, extracting the mixture with ether, washing the extract soluion with water, drying the solution over anhydrous sodium sulfate and removing the solvent affords 331 mg. of crude crystals, which gives pure crystals of Vb by recrystallization with ether.

Vb: M.P. 67–70° C. (monohydrate).

Analysis.—Calcd. for $C_{20}H_{31}N \cdot H_2O$: C, 79.15, H, 10.96. Found: C, 79.28, H, 10.66.

IR: $\nu_{max.}^{CHCl_3}$ 3386, 3066, 1658, 879 cm.$^{-1}$

Example 10.—(±)-2-ethoxycarbonyl - 4β - methyl-14-methylene-4β,10bβ-propano - 6aβ,8β - ethanoperhydrobenz[h]isoquinoline (Vc)

Adding simultaneously a mixture of ethyl chloroformate and ether (1:7, 8 ml.) and 2 N-sodium hydroxide solution (8 ml.) into a solution of crude Vb (314 mg.) in a mixture of ether (10 ml.) and water (5 ml.) stirred under ice-cooling within 50 minutes, further reacting the mixture at room temperature for 2 hours, adding water to the mixture, extracting the mixture with ether, washing the extract with water, 2 N-hydrochloric acid and water, drying over anhydrous sodium sulfate and removing the solvent affords oily Vc (yield, 100%), which yields only one spot on thin-layer chromatogram.

Vc: IR: $\nu_{max.}^{CHCl_3}$ 3067, 1675, 880 cm.$^{-1}$

Example 11.—(±) - 2 - ethoxycarbonyl-4β-methyl-14-bromomethyl - 4β,10bβ - propano-6aβ,8β-ethenoperhydrobenz[h]isoquinoline (VIa) and (±)-2-ethoxycarbonyl - 4β - methyl-14-methylene-15β-bromo-4β,10bβ - propano - 6aβ,8β - ethanoperhydrobenz[h]isoquinoline (VI′a)

Dissolving Vc (354 mg.) in tetrachloromethane (20 ml.) dried over potassium carbonate, distilling off 5 ml. of the solvent to remove trace contaminant of water, refluxing for 30 minutes after addition of N-bromosuccinimide (185 mg.) and dibenzoyl peroxide (13 mg.), filtering the suspensoid from the reaction mixture after chilling, washing with water, drying over anhydrous sodium sulfate and concentrating the solution under reduced pressure affords oily mixture of VIa and VI′a.

Example 12.—(±)-2-ethoxycarbonyl - 4β - methyl-14β-bromomethyl - 14α,15α - epoxy-4β,10bβ-propano-6aβ,8β-ethanoperhydrobenz[h]isoquinoline (VIIa) and (±)-2-ethoxycarbonyl-4β-methyl - 15α - bromo - 4β,10bβ - propano - 6aβ,8β - ethanoperhydrobenz[h]isoquinoline-14-spiro-2-oxirane (VII′a)

Keeping a mixture of the above oily VIa and VI′a in anhydrous benzene (3 ml.) and 0.72 N-perbenzoic acid solution (2 ml.) at 15–18° C. for 43 hours in a closed vessel placed in a dark room and concentrating the mixture under reduced pressure on a water-bath heated at 30° C. affords oil mixture of VIIa and VII′a.

Example 13.—(±)-2-ethoxycarbonyl - 4β - methyl-14-methylene - 4β,10bβ - propano-6aβ,8β-ethanoperhydrobenz[h]isoquinolin-15α-ol (VIIIa) and (±)-2-ethoxycarbonyl - 4β - methyl-4β,10bβ-propano-6αβ,8β-ethenoperhydrobenz[h]isoquinoline-14-methanol (VIII′a)

Refluxing the above oily mixture of VIIa and VII′a in anhydrous butanol (10 ml.) with zinc powder (4.2 g.) for 4 hours under stirring, filtering the mixture after chilling, washing the filtrate with 2 N-sodium hydroxide solution and water, drying over anhydrous sodium sulfate and distilling off the solvent affords crude crystals (3.9 g.), which affords crystalline VIIIa (yield, calcd. from Vc 9%) from the eluates of petroleum ether-benzene (1:2) to benzene and thereafter crystalline VIII′a (yield calcd. from Vc, 10%) from the eluates of benzene-chloroform (9–4:1).

VIIIa: M.P. 150–151° C.

Analysis.—Calcd. for $C_{23}H_{35}O_3N$: C, 73.95, H, 9.45. Found: C, 73.93, H, 9.42.

IR: $\nu_{max.}^{CHCl_3}$ 3618, 1675, 906 cm.$^{-1}$

VIII′a: M.P. 129–130.5° C.

Analysis.—Calcd. for $C_{23}H_{35}O_3N$: C, 73.95, H, 9.45. Found: C, 73.81, H, 9.63.

IR: $\nu_{max.}^{CHCl_3}$ 3624, 1676, 1012 cm.$^{-1}$

Example 14.—(±) - 4β - methyl-14-methylene-4β,10bβ-propano - 6aβ,8β - ethanoperhydrobenz[h]isoquinoline-15α-ol (VIIIb)

Refluxing VIIIa (30 mg.) in 2 ml. of diethylene glycol containing 0.5% of hydrazine and 240 mg. of potassium hydroxide for 30 minutes in nitrogen atmosphere, admixing the reaction mixture with water, extracting the mixture with ether, extracting the extract solution with 10%-tartaric solution, alkalinifying the tartaric solution with 2 N-sodium hydroxide solution, extracting the alkaline solution with ether and crystallizing the extract from methanol-ether affords long scaly crystals of VIIIb (yield, 51%).

VIIIb: M.P. 182–182.5° C.

Analysis.—Calcd. for $C_{20}H_{31}ON$: C, 79.67, H, 10.37. Found: C, 79.41, H, 10.65.

IR: $\nu_{max.}^{CHCl_3}$ 3606, 3393, 3077, 1661, 906 cm.$^{-1}$

VIIIb is identified with dihydro pyrolysis base B prepared from naturally-occurring veatchine.

Example 15.—(±)-2-(2-hydroxyethyl)-4β-methyl - 14-methylene-4β,10bβ-propano - 6aβ,8β - ethanoperhydrobenz[h]isoquinolin-15α-ol (IXa)

Refluxing gently a suspension of crude VIIIb (16 mg.) in anhydrous methanol (3 ml.), ethylene chlorohydrin (1 ml.) and dry sodium carbonate powder (100 mg.) for 18 hours under vigorous stirring, evaporating the mixture to dryness, dissolving the evaporation residue into aqueous sodium chloride solution, extracting the aqueous solution with ether, extracting the ether solution with 10%-tartaric acid solution, alkalinifying the tartaric solution with 2 N-sodium hydroxide solution, extracting the alkaline solution with ether and, finally, crystallizing the extract from acetone affords crystalline IXa (yield, 69%).

IXa: M.P. 138–141° C.

Analysis—Calcd. for $C_{22}H_{35}O_2N$: C, 76.47, H, 10.21. Found: C, 76.67, H, 10.21.

IR: $\nu_{max.}^{CHCl_3}$ 3618, 3479, 1662, 905 cm.$^{-1}$

IXa is identified with dihydroveatchine prepared from naturally occuring veatchine.

Example 16.—(±)-2-methanesulfonyl-4β - methyl - 4β,10bβ-propano-6aα,8α - ethenoperhydrobenz[h]isoquinoline(IIb)

Refluxing IIa (1 g.) in ethanol (90 ml.) with 2 N potassium hydroxide solution (22 ml.) for 90 minutes, admixing the reaction mixture with water, extracting the mixture with chloroform and crystallizing the extract from acetone-ether affords crystalline IIb (yield, 94%).

IIb: M.P. 189–191/203–204° C. (double melting point).

Analysis.—Calcd. for $C_{20}H_{31}O_3NS$: C, 65.73, H, 8.55, N, 3.83. Found: C, 65.97, H, 6.85, N, 4.06.

IR: $\nu_{max.}^{CHCl_3}$ 3591, 1333, 1148 cm.$^{-1}$

Example 17.—(±)-2-methanesulfonyl-4β-methyl - 14β,15β-epoxy-4β,10bβ-propano - 6aα,8α - ethanoperhydrobenz[h]isoquinolin-8-ol (Xa)

Keeping a mixture of IIb (0.8 g.) in benzene (35 ml.) and 0.295 M-perbenzoic acid solution in benzene (12 ml.) for 38 hours at room temperature, pouring the reaction mixture into ice water, extracting the mixture with chloroform and crystallizing the extract from acetone-ether affords Xa (yield, 90%).

Xa: M.P. 260.5–262° C.

*Analysis.*—Calcd. for $C_{20}H_{31}O_4NS$: C, 62.97, H, 8.19, N, 3.67. Found: C, 62.56, H, 8.27, N, 3.78.

IR: $\nu_{max.}^{CHCl_3}$ 3592, 1340, 1147, 897 cm.$^{-1}$

Example 18.—(±)-2-methanesulfonyl-4β-methyl-7β - hydroxy-4β,10bβ-propano - 6aβ,8β - ethanoperhydrobenz[h]isoquinolin-14-one (XIa)

Keeping a mixture of Xa (755 mg.) in anhydrous tetrahydrofuran (45 ml.) and diethylaluminum chloride (1.5 ml.) in anhydrous tetrahydrofuran (6.5 ml.) overnight at room temperature, pouring the reaction mixture into 2 N-sodium hydroxide solution, extracting the mixture with chloroform and chromatographing the extract on alumina affords crystalline XIa (yield, 59%) from the eluate of benzene-chloroform (2–1:1).

XIa: M.P. 242–243° C. (from acetone-ether).

*Analysis.*—Calcd. for $C_{20}H_{31}O_4NS$: C, 62.97, H, 8.19, N, 3.67. Found: C, 63.03, H, 8.24, N, 3.65.

IR: $\nu_{max.}^{CHCl_3}$ 3630, 1744, 1337, 1151 cm.$^{-1}$

Example 19.—(±)-2-methanesulfonyl-4β-methyl-7β - hydroxy-4β,10bβ-propano - 6aβ,8β - ethanoperhydrobenz[h]isoquinolin-14-one ethylene ketal (XIb)

Distilling the mixture of XIa (0.4 g.), p-toluenesulfonic acid (23 mg., monohydrate) and ethylene glycol (150 ml.) under reduced pressure (B.P.$_3$ 87–89° C.) for 3 hours to remove about 110 ml. of distillate, pouring the distillation residue into 2 N-sodium hydroxide solution containing crushed ice, extracting the mixture with chloroform and crystallizing the extract from dichloromethane-ether affords XIb (yield, 89%).

XIb: M.P. 220–221° C.

*Analysis.*—Calcd. for $C_{22}H_{35}O_5NS$: C, 62.09, H, 8.29. Found: C, 61.75, H, 8.27.

IR: $\nu_{max.}^{CHCl_3}$ 3533, 1346, 1148, 1095 cm.$^{-1}$

Example 20.—(±)-2-methanesulfonyl-4β-methyl-4β,10bβ-propano-6aβ,8β - ethanoperhydrobenz[h]isoquinoline-7,14-dione 14-ethylene ketal (XIIa)

Keeping a mixture of XIb (0.4 g.) in pyridine (6 ml.) and chromium trioxide (1 g.) in pyridine (10 ml.) for 14 hours at room temperature, pouring the reaction mixture into 300 ml. of water, extracting the mixture with ether-dichloromethane (3:1) and crystallizing the extract from dichloromethane-ether affords crystals of XIIa (yield, 94%).

XIIa: M.P. 205–206° C.

*Analysis.*—Calcd. for $C_{22}H_{33}O_5NS$: C, 62.38, H, 7.85, N, 3.31. Found: C, 62.28, H, 7.86, N, 3.31.

IR: $\nu_{max.}^{CHCl_3}$ 1738, 1337, 1151, 1109 cm.$^{-1}$

Example 21.—(±)-2-methanesulfonyl-4β-methyl-4β,10bβ-propano-6aβ,8β-ethanoperhydrobenz[h]isoquinolin - 14-one ethylene ketal (IVb) and (±)-4β-methyl-4β,10bβ-propano-6aβ,8β-ethanoperhydrobenz[h]isoquinolin - 14-one (IVc)

Heating a mixture of XIIa (0.3 g.), anhydrous hydrazine (4 ml.), triethylene glycol (9 ml.) and hydrazine hydrochloride (0.9 g.) at 120° C. for 2 hours, adding 1.6 g. of potassium hydroxide thereto, again heating the mixture to raise the temperature up to 215° C. within 1 hour and keeping the temperature 1 hour, pouring the reaction mixture into ice water and extracting the mixture with dichloromethane affords a chloroform solution of the crude product, which is, after being washed with 2 N-hydrochloric acid, evaporated and crystallized from ether to give crystalline IVb (yield, 91%).

IVb: M.P. 198.5–200° C.

*Analysis.*—Calcd. for $C_{22}H_{35}O_4NS$: C, 64.52, H, 8.62. Found: C, 64.62, H, 8.50.

IR: $\nu_{max.}^{CHCl_3}$ 1339, 1152, 1114 cm.$^{-1}$

On neutralizing the above acidic washing by addition of solid potassium carbonate, extracting the neutral solution with dichloromethane and distilling off the solvent, IVc is obtained as amorphous substance (8 mg. IR: $\nu_{max.}^{CHCl_3}$ 1733 cm.$^{-1}$)

Example 22.—(±)-2-methanesulfonyl-4β-methyl-4β,10bβ-propano-6aβ,8β-ethanoperhydrobenz[h]isoquinolin - 14-one (IVa)

Heating IVc (25 mg.) in a mixture of acetic acid (2 ml.) and water (0.5 ml.) on a boiling water bath for 1 hour, admixing the reaction mixture with ice water, neutralizing the mixture with 2 N-sodium carbonate, extracting with dichloromethane and crystallizing the extract from acetone-ether affords crystalline IVa (M.P. 215–217° C., yield, 89%) identical to what is obtained in Example 7.

Example 23.—(±)-2-cyano-4β-methyl-14-methylene-4β,10bβ - propano - 6aβ,8β - ethanoperhydrobenz[h]isoquinoline (Vd)

Reacting V (55 mg.) with dry potassium carbonate powder (460 mg.) and powdery cyanogen bromide (70 mg.) in anhydrous tetrahydrofuran (3 ml.) at room temperature for 1 hour under vigorous stirring, pouring the reaction mixture into 2 N-sodium hydroxide solution containing crushed ice, extracting with ether-dichloromethane (3:1) and distilling off the solvent affords crude crystals of Vd (57 mg.).

Example 24.—(±)-2-cyano-4β-methyl-14β-bromomethyl-14α,15α - epoxy - 4β,10bβ - propano-6aβ,8β-ethanoperhydrobenz[h]isoquinoline (VIIb)

Refluxing a mixture of crude crystals of Vd (57 mg.), N-bromosuccinimide (32 mg.), benzoyl peroxide (2.2 mg.) in tetrachloromethane (3 ml.) for 15 minutes under stirring, chilling the reaction mixture, filtering the mixture, washing the filtrate with ice water and evaporating affords crude product, which is dissolved into 1 ml. of benzene, admixed with 0.34 ml. of 0.8 M-perbenzoic acid solution in benzene and kept at 25° C. for 18 hours in a dark place. The reaction mixture is poured into 2 N-sodium hydroxide solution containing crushed ice pieces and extracted with ether. The extract, after being washed with water and distillation, gives crude crystals of VIIb (55 mg.).

Example 25.—(±)-2-cyano-4β-methyl - 14-methylene-4β,10bβ - propano - 6aβ,8β - ethanoperhydrobenz[h]isoquinolin-15α-ol (VIIIc) and (±)-2-cyano-4β-methyl-4β,10bβ - propano - 6aβ,8β - ethenoperhydrobenz[h]isoquinoline-14-methanol (VIII'b)

Refluxing crude crystals of VIIb (55 mg.) and zinc powder (560 mg.) in a mixture of dimethylformamide (2.5 ml.) and water (0.05 ml.) for 2 hours under vigorous stirring, filtering the mixture and distilling off the solvent gives 37 mg. of residue, which is chromatographed on 2 g. of alumina. The benzene eluate affords crystalline VIIIc (4.1 mg.) after rechromatographing on silica gel developed by benzene-ethyl acetate (1:1) and eluted by dichloromethane-methanol (9:1).

VIIIc: MP. 171–174° C. (from ether-pentane).

IR: $\nu_{max.}^{CHCl_3}$ 3625, 2109, 1663, 908 cm.$^{-1}$

The benzene-chloroform (9–4:1) eluate affords 6.6 mg. of crystalline VIII'b (confirmed presence of OH and CN groups and absence of =CH$_2$ group by IR spectrum).

Example 26.—(±) - 4β-methyl-14 - methylene-4β,10bβ-propano - 6aβ,8β - ethanoperhydrobenz[h]isoquinolin-15α-ol (VIIIb)

Refluxing a mixture of VIIIc (3 mg.) in anhydrous tetrahydrofuran (1.2 ml.) and lithium aluminium hydride (18 mg.) in tetrahydrofuran (0.3 ml.) for 5 hours under stirring, adding ice water thereto to decompose the reagent which remained unchanged, admixing the mixture with 2

N-sodium hydroxide solution, extracting the mixture with ether-dichloromethane (3:1) and purifying the extract by layer chromatography affords 2 mg. of VIIIb (M.P. 182–182.5° C., identified with what is obtained in the Example 14).

Example 27.—(±) - 2 - ethoxycarbonyl - 4β - methyl-14-bromomethyl - 4β,10bβ - propano - 6aβ,8β - ethenoperhydrobenz[h]isoquinoline (VIa)

Refluxing a mixture of Vc (106 mg.), N-bromosuccinimide (55 mg.) and benzoyl peroxide (3 mg.) in anhydrous tetrachloromethane for 30 minutes, chilling and filtering the reaction mixture and evaporating the filtrate under reduced pressure affords 130 mg. of crude crystals of VIa.

Example 28.—(±) - 2 - ethoxycarbonyl - 4β-methyl-14β-bromomethyl - 14α,15α-epoxy-4β,10bβ-propano-6aβ,8β-ethanoperhydrobenz[h]isoquinoline (VIIa)

Allowing to stand a mixture of the above crude crystals of VIa (130 mg.) in anhydrous benzene (1.5 ml.) and 0.285 M-perbenzoic acid solution in benzene (1.57 ml.) at room temperature for 40 hours, pouring the reaction mixture into 2 N-potassium hydroxide solution containing ice pieces, extracting the mixture with ether-dichloromethane (4:1) and evaporating the extract solution affords 136 mg. of crude crystals, which gives crystalline VIIa from the eluate of petroleum ether-benzene (2–1:1) of chromatography on alumina.

VIIa: M.P. 145–147° C. (from ether-pentane).
Analysis.—Calcd. for $C_{23}H_{34}O_3NBr$: C, 61.06, H, 7.58, N, 3.16. Found: C, 61.68, H, 7.75, N, 3.42.

IR: $\nu_{max.}^{CHCl_3}$ 1676, 936 cm.$^{-1}$

Example 29.—(±) - 2 - ethoxycarbonyl - 4β - methyl-14-methylene - 4β,10bβ - propano-6aβ,8β-ethanoperhydrobenz[h]isoquinolin-15α-ol (VIIIa)

Refluxing VIIa (5.3 mg.) and zinc powder (70 mg.) in anhydrous ethanol (1 ml.) under stirring, pouring the reaction mixture into water, extracting the mixture with ether and evaporating the extract solution affords crude crystalline product, which is purified by successive thin layer chromatography on silica gel with developers, benzene-ethyl acetate (2:1) and dichloromethane-methanol (9:1) systems, to give crystalline VIIIa (M.P. 150–151° C., recrystallized from ether-pentane).

What we claim is:
1. A process for preparing a compound of the formula

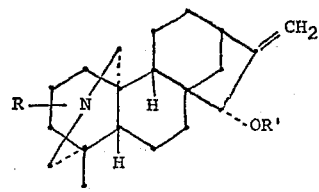

wherein R is 2-hydroxyethyl group and R' is a member selected from the group consisting of H, lower alkanoyl and lower alkoxycarbonyl, which comprises dehydrating (Step 1) a compound of the formula

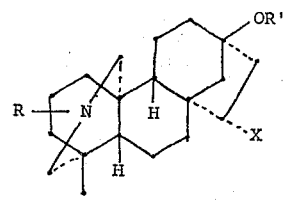

wherein R is a member selected from the group consisting of H, cyano, lower alkyl, lower alkanoyl, lower alkoxycarbonyl and lower hydrocarbon-sulfonyl, R' is a member selected from the group consisting of lower alkanoyl and lower alkoxycarbonyl and X is the hydroxyl group by treatment with a member selected from the group consisting of hydrocarbon-sulfonyl halide and a halogenating agent followed by treatment with an organic base, converting thus-produced compound of formula

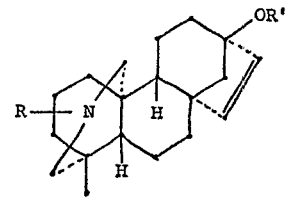

wherein R is a member selected from the group consisting of cyano, lower alkanoyl, lower alkoxycarbonyl and lower hydrocarbon-sulfonyl and R' is a member selected from the group consisting of H, lower alkanoyl and lower alkoxycarbonyl group by hydroborating (Step 2) Compound II, selectively esterifying (Step 3) thus-produced compound of the formula

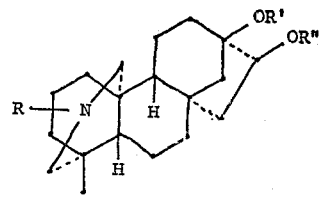

wherein R and R' are as precedingly recited and R" is H, with lower arenesulfonyl halide of the formula

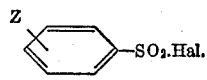

wherein Hal. is a halogen atom and Z is up to 2 members selected from the group consisting of H, halogen, lower alkyl, nitro and lower alkoxy, and subjecting (Step 4) thus-produced compound of the Formula III wherein R and R' are as precedingly defined and R" is lower arenesulfonyl of the formula:

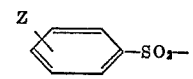

wherein Z is as precedingly defined, to solvolysis or base-catalyzed elimination accompanied with simultaneous rearrangement, thereafter subjecting (Step 5) thus-produced compound of the formula

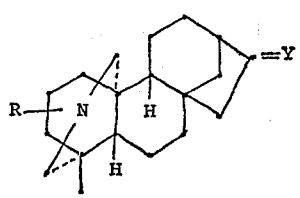

wherein R is as precedingly defined and Y is an oxygen atom, to Wittig's reaction or Grignard's reaction followed by dehydration, halogenating (Step 6) thus-produced compound of the formula

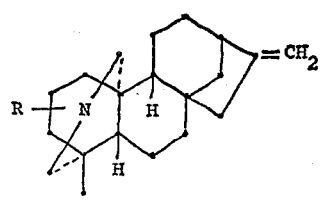

wherein R is as precedingly defined, by Wohl-Ziegler's method, epoxidizing (Step 7) thus-produced compound of the formula

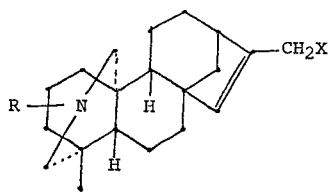

wherein R is as precedingly defined and X is halogen, with an organic peracid, reducing (Step 8) thus-produced compound of the formula

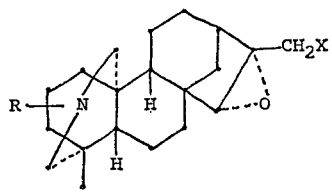

wherein R is a member selected from the group consisting of H, cyano, lower alkyl, lower alkanoyl, lower alkoxycarbonyl and lower hydrocarbon-sulfonyl and X is as precedingly defined, and, finally, subjecting (Step 9) thus-produced compound of the formula

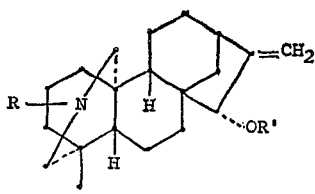

wherein R is a hydrogen atom and R' is a member selected from the group consisting of a hydrogen atom, lower alkanoyl and lower alkoxycarbonyl, to reaction with a member selected from the group consisting of ethylene halohydrin and ethylene oxide.

2. A process according to claim 1, wherein Steps 2 to 4 inclusive are replaced by epoxidizing (Step 2') the compound

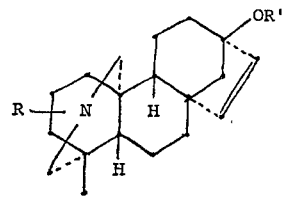

with an organci peracid, treating (Step 3') thus-produced compound

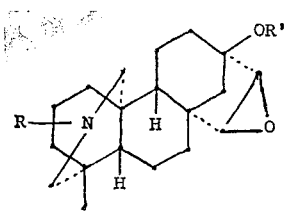

wherein R is as previously defined and R' is a hydrogen atom, with Lewis acid, oxidizing (Step 4') thus-produced compound of the formula

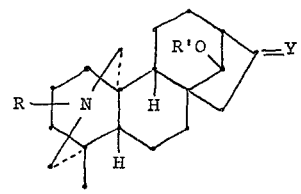

wherein R and R' are as precedingly defined and Y is a member selected from the group consisting of bis(lower alkyl) ketal and lower alkylene ketal, with an oxidizing reagent, and subjecting (Step 4") thus-produced compound of the formula

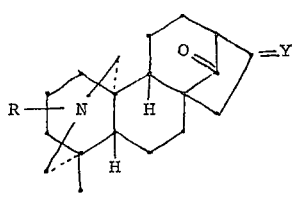

wherein R and Y are as precedingly defined to Wolff-Kishner's reduction method.

3. A compound of the formula

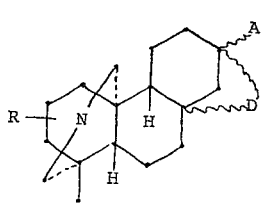

wherein R is a member selected from the group consisting of a hydrogen atom, cyano, lower alkyl, lower alkanoyl, lower alkoxycarbonyl and lower hydrocarbon-sulfonyl, A is a member selected from the group consisting of H, hydroxyl, lower alkanoyloxy and lower alkoxycarbonyloxy, and D is a member selected from the group consisting of

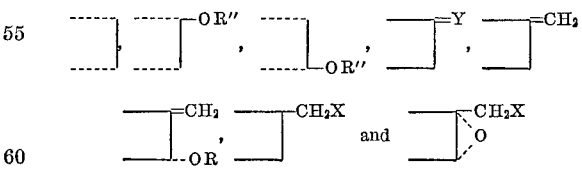

wherein R' is a member selected from the group consisting of H, lower alkanoyl and lower alkoxycarbonyl, R" is a member selected from the group consisting of H and

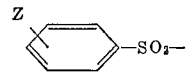

wherein Z is up to 2 members selected from the group consisting of H, halogen, lower alkyl, nitro and lower alkoxy, X is a halogen atom and Y is a member selected from the group consisting of an oxygen atom, bis(lower alkyl) ketal and lower alkylene ketal.

4. A compound of the formula

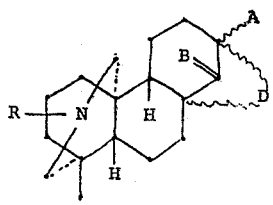

wherein R is a member selected from the group consisting of a hydrogen atom, cyano, lower alkyl, lower alkanoyl, lower alkoxycarbonyl and lower hydrocarbon-sulfonyl, A is a member selected from the group consisting of H, hydroxyl, lower alkanoyloxy and lower alkoxycarbonyloxy, B is a member selected from the group consisting of two hydrogen atoms, an oxygen atom or

and D is a member selected from the group consisting of

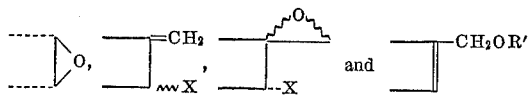

wherein R' is a member selected from the group consisting of H, lower alkanoyl and lower alkoxycarbonyl, R" is a member selected from the group consisting of H and

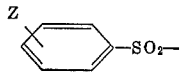

wherein Z is up to 2 members selected from the group consisting of H, halogen, lower alkyl, nitro and lower alkoxy, X is a halogen atom and Y is a member selected from the group consisting of an oxygen atom, bis(lower alkyl) ketal and lower alkylene ketal.

5. 2 - methanesulfonyl - 4β - methyl - 4β,10bβ - propano - 6aα,8α - ethanoperhydrobenz[h]isoquinoline - 8β, 15β - diol and its 8 - acetate.

6. 4β - methyl - 4β,10bβ - propano - 6aβ,8β - ethanoperhydrobenz[h]isoquinolin - 14 - one and its 2 - methanesulfonate and 14-ethylene ketal.

7. 4β - methyl - 14 - methylene - 4β,10bβ - propano- 6aβ,8β - ethanoperhydrobenz[h]isoquinoline and its 2-cyanate, 2-methanesulfonate and 2-ethoxycarbonate.

8. 2 - ethoxycarbonyl - 4β - methyl - 14 - bromomethyl - 4β,10bβ - propano - 6aβ,8β - ethenoperhydrobenz[h]-isoquinoline.

9. 2 - ethoxycarbonyl - 4β - methyl - 14 - methylene- 15ξ - bromo - 4β,10bβ - propano - 6aβ,8β - ethanoperhydrobenz[h]isoquinoline.

10. 4β - methyl - 14β - bromomethyl - 14α,15α - epoxy- 4β,10bβ - propano - 6aβ,8β - ethanoperhydrobenz[h]isoquinoline 2-cyanate and 2-ethoxycarbonate.

11. 2 - ethoxycarbonyl - 4β - methyl - 15α - bromo- 4β,10bβ - propano - 6aβ,8β - ethanoperhydrobenz[h]isoquinoline-14-spiro-2-oxirane.

12. 4β - methyl - 14 - methylene - 4β,10bβ - propano- 6aβ,8β - ethanoperhydrobenz[h]isoquinolin - 15α - ol and its 2-cyanate and 2-ethoxycarbonate.

13. 4β - methyl - 4β,10bβ - propano - 6aβ,8β - ethenoperhydrobenz[h]isoquinoline - 14 - methanol 2 - cyanate and 2-ethoxycarbonate.

14. 2 - (2 - hydroxyethyl) - 4β - methyl - 14 - methylene - 4β,10bβ - propano - 6aβ,8β - ethanoperhydrobenz[h]isoquinolin-15α-ol.

15. 2 - methanesulfonyl - 4β - methyl - 14β,15β - epoxy- 4β,10bβ - propano - 6aα,8α - ethanoperhydrobenz[h]isoquinolin-8-ol.

16. 2 - methanesulfonyl - 4β - methyl - 7β - hydroxy- 4β,10bβ - propano - 6aβ,8β - ethanoperhydrobenz[h]isoquinolin-14-one and its 14-ethylene ketal.

17. 2 - methanesulfonyl - 4β - methyl - 4β,10bβ - propano - 6aβ,8β - ethanoperhydrobenz[h]isoquinoline - 7, 14-dione 14-ethylene ketal.

18. 2 - methanesulfonyl - 4β - methyl - 4β,10bβ - propano - 6aα,8α - ethenoperhydrobenz[h]isoquinolin - 8β-ol and its 8-acetate.

19. 2 - methanesulfonyl - 4β - methyl - 4β,10bβ - propano - 6aα,8α - ethanoperhydrobenz[h]isoquinoline - 8β, 14β - diol and its 8 - acetate, 14 - p - bromobenzenesulfonate and 8,14-acetonide.

References Cited

Manske, The Alkaloids, vol. 7, Academic Press (1960), pp. 478–9.

Merck Index, 7th ed. (1960), pp. 472 and 1090.

NICHOLAS S. RIZZO, *Primary Examiner.*

DONALD G. DAUS, *Assistant Examiner.*

U.S. Cl. X.R.

167—65; 204—158; 260—281, 289, 290, 326, 348, 348.6, 543, 557, 583, 590, 606.5, 632, 635, 686, 687, 690, 694